(12) United States Patent
Tang et al.

(10) Patent No.: US 12,063,598 B2
(45) Date of Patent: Aug. 13, 2024

(54) REDUCED POWER CONSUMPTION BY OBTAINING TIME DOMAIN RESOURCE ALLOCATION PATTERNS IN ADVANCE VIA ADDITIONAL SIGNALING

(71) Applicant: Apple Inc., Cupertino, CA (US)

(72) Inventors: Jia Tang, San Jose, CA (US); Haitong Sun, Irvine, CA (US); Dawei Zhang, Saratoga, CA (US); Yuchul Kim, Santa Clara, CA (US); Zhu Ji, San Jose, CA (US); Wei Zeng, Cupertino, CA (US); Wei Zhang, Santa Clara, CA (US); Ping Wang, San Jose, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 495 days.

(21) Appl. No.: 16/582,563

(22) Filed: Sep. 25, 2019

(65) Prior Publication Data
US 2020/0145924 A1    May 7, 2020

Related U.S. Application Data

(60) Provisional application No. 62/755,168, filed on Nov. 2, 2018.

(51) Int. Cl.
*H04W 52/02* (2009.01)
*H04W 72/0446* (2023.01)
*H04W 88/02* (2009.01)

(52) U.S. Cl.
CPC ... *H04W 52/0235* (2013.01); *H04W 72/0446* (2013.01); *H04W 88/02* (2013.01)

(58) Field of Classification Search
CPC ............... H04L 5/0094; H04L 5/0053; H04W 52/0235; H04W 52/0212; H04W 72/0446;
(Continued)

(56) References Cited

U.S. PATENT DOCUMENTS 8,675,588 B2    3/2014    Fujishima
9,161,319 B2   10/2015    Cheng
(Continued)

FOREIGN PATENT DOCUMENTS

CN    106375060    2/2017
CN    109792756    5/2019

OTHER PUBLICATIONS

Huang et al. U.S. Appl. No. 62/585,194, filed Nov. 13, 2017 (Year: 2017).*

(Continued)

*Primary Examiner* — Wutchung Chu
(74) *Attorney, Agent, or Firm* — Kowert, Hood, Munyon, Rankin & Goetzel, P.C.

(57) ABSTRACT

A device may obtain, through wireless signaling from a network, a time-domain wireless-resource allocation (TWRA) pattern allocated to the device by the network and corresponding to a future time interval (TTI) for which the device has not yet decoded corresponding control information. This enables the device to conduct wireless communications during the TTI using resources allocated according to the obtained TWRA pattern, without first having to decode control information to identify the TWRA pattern. The device may obtain the TWRA pattern by obtaining an indication from the network that the TWRA pattern remains associated with future wireless communications of the device until indicated otherwise by the network, and/or by transmitting to the network an indication of preferred parameters associated with the future wireless communications and the TWRA pattern, and/or by transmitting to the network a request to have the network change from a different TWRA pattern to the TWRA pattern.

20 Claims, 18 Drawing Sheets

(58) Field of Classification Search
CPC . H04W 72/0493; H04W 88/02; H04W 72/53; H04W 72/21; H04W 72/23; Y02D 30/70
See application file for complete search history.

(56) References Cited

U.S. PATENT DOCUMENTS

| | | | | |
|---|---|---|---|---|
| 10,524,248 | B2* | 12/2019 | Yeo | H04L 5/0053 |
| 11,870,631 | B2* | 1/2024 | Selvanesan | H04L 27/2607 |
| 2008/0049690 | A1* | 2/2008 | Kuchibhotla | H04L 5/0044 370/338 |
| 2014/0328260 | A1* | 11/2014 | Papasakellariou | H04W 72/23 370/329 |
| 2015/0131536 | A1* | 5/2015 | Kaur | H04L 5/0055 370/329 |
| 2017/0055240 | A1* | 2/2017 | Kim | H04W 72/12 |
| 2017/0230956 | A1* | 8/2017 | Kim | H04L 5/0032 |
| 2017/0273077 | A1* | 9/2017 | Kim | H04W 76/14 |
| 2018/0027584 | A1* | 1/2018 | Andersson | H04W 72/23 370/329 |
| 2018/0184413 | A1 | 6/2018 | Rong | |
| 2018/0184439 | A1* | 6/2018 | Lee | H04W 72/21 |
| 2018/0199341 | A1 | 7/2018 | Baldemair | |
| 2018/0270698 | A1 | 9/2018 | Babaei | |
| 2018/0279274 | A1* | 9/2018 | Sun | H04W 52/367 |
| 2019/0036738 | A1 | 1/2019 | Miao | |
| 2019/0068253 | A1 | 2/2019 | Venkatachalam Jayaraman | |
| 2019/0075585 | A1* | 3/2019 | Deogun | H04W 72/1273 |
| 2019/0132862 | A1 | 5/2019 | Jeon | |
| 2019/0149365 | A1* | 5/2019 | Chatterjee | H04L 5/0094 370/329 |
| 2019/0150142 | A1* | 5/2019 | Huang | H04W 72/23 370/336 |
| 2019/0215807 | A1* | 7/2019 | Hwang | H04L 5/00 |
| 2019/0268795 | A1* | 8/2019 | Wu | H04W 24/10 |
| 2020/0053756 | A1* | 2/2020 | Sun | H04W 72/1273 |
| 2020/0107321 | A1* | 4/2020 | Yang | H04W 72/23 |
| 2020/0120642 | A1* | 4/2020 | Hwang | H04W 72/04 |
| 2020/0120680 | A1* | 4/2020 | Hwang | H04L 1/00 |
| 2020/0305167 | A1* | 9/2020 | Freda | H04W 4/40 |
| 2020/0396759 | A1* | 12/2020 | Baldemair | H04L 5/0055 |
| 2021/0067396 | A1* | 3/2021 | Selvanesan | H04L 27/2607 |
| 2021/0167930 | A1* | 6/2021 | Jeon | H04L 5/0098 |
| 2021/0266932 | A1* | 8/2021 | Liu | H04W 72/535 |
| 2022/0053522 | A1* | 2/2022 | MolavianJazi | H04W 72/1263 |

OTHER PUBLICATIONS

Sun et al. U.S. Appl. No. 62/717,680, filed Aug. 10, 2018 (Year: 2018).*
Apple, Inc., "Network-indication based Approaches for UE Power Saving," 3GPP Draft: R1-1811127 Network-Indication Basesd Approaches for UE Power Saving. V1, 3rd Generation Partnership Project, vol. 1, RAN WG1, Chengdu, China; Oct. 8, 2018-Oct. 12, 2018, Sep. 29, 2018, XP051518529, section 2.3, 6 pages.
Huawei, et al., "Power Consumption Reduction Based on Time/Frequency/Antenna Adaptation," 3GPP Draft; R1-181054, 3rd Generation Partnership, vol. RAN WG1, No. Chengdu China; Oct. 8, 2018-Oct. 12, 2018, Sep. 29, 2018, XP051517569, section 2.1, 2.4, 5 pages.
Extended European Search Report from Application No. 19205843.6-1205, Apple Inc., dated Apr. 2, 2020, 8 pages.
First Examination Report for IN Patent Application No. 201914043384, dated May 10, 2021.
Huawei, et al., "Power Consumption Reduction Based on Time/Frequency/Antenna Adaptation," 3GPP TSG RAN WG1 Meeting #94bis, R1-1810154, Chengdu, China; Oct. 8-12, 2018.
3rd Generation Partnership Project; Technical Specification Group Radio Access Network; NR:Physical layer procedures for data (Release 15) 3GPP TS 38.214 v14.3.0; Sep. 2018; 96 pages.
Qualcomm Incorporated "Advanced Grant Indication for UE Power Saving" 3GPP TSG RAN WG1 NR AdHoc#3 R1-1716418; Nagoya, Japan; Sep. 18-21, 2017; 6 pages.
First Office Action For CN Patent Application No. 201911058027.5; 24 pages; dated Nov. 3, 2022.

* cited by examiner

| Parameter | Meaning |
|---|---|
| K0 | Distance between PDCCH and its corresponding PDSCH (# slots) K0 = 0: same-slot scheduling; K0 > 0: cross-slot scheduling. |
| Mapping Type | Type-A: slot-based; or Type-B: mini-slot based. |
| Start Symbol and Length | PDSCH start symbol index and length (# symbols) |

*FIG. 6*
*(Prior Art)*

| Type | S(tart) | L(ength) | S+L |
|---|---|---|---|
| A: Slot | {0,1,2,3} | {3,....,14} | {3,....,14} |
| B: Mini-Slot | {0,....,12} | {2,4,7} | {2,....,14} |

*FIG. 7*
*(Prior Art)*

| Row index | dmrs-TypeA-Position | PDSCH Mapping Type | K0 | S | L |
|---|---|---|---|---|---|
| 1 | 2 | Type A | 0 | 2 | 12 |
| 1 | 3 | Type A | 0 | 3 | 11 |
| 2 | 2 | Type A | 0 | 2 | 10 |
| 2 | 3 | Type A | 0 | 3 | 9 |
| 3 | 2 | Type A | 0 | 2 | 9 |
| 3 | 3 | Type A | 0 | 3 | 8 |
| 4 | 2 | Type A | 0 | 2 | 7 |
| 4 | 3 | Type A | 0 | 3 | 6 |
| 5 | 2 | Type A | 0 | 2 | 5 |
| 5 | 3 | Type A | 0 | 3 | 4 |
| 6 | 2 | Type B | 0 | 9 | 4 |
| 6 | 3 | Type B | 0 | 10 | 4 |
| 7 | 2 | Type B | 0 | 4 | 4 |
| 7 | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

FIG. 18

| Row index | dmrs-TypeA-Position | PDSCH Mapping Type | K0 | S | L |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | 2,3 | Type B | 0 | 2 | 2 |
| 7 | 2,3 | Type B | 0 | 4 | 2 |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 (Note 1) | 2,3 | Type B | 0 | 10 | 4 |
| 13 (Note 1) | 2,3 | Type B | 0 | 2 | 7 |
| 14 (Note 1) | 2 | Type A | 0 | 2 | 12 |
| 15 | 3 | Type A | 0 | 3 | 11 |
| 16 | 2,3 | Type B | 1 | 2 | 4 |
| Reserved | | | | | |

Note 1: if the PDSCH was scheduled with SI-RNTI in PDCCH Type0 common search space, the UE may assume that this PDSCH resource allocation is not applied

*FIG. 19*

| Row index | dmrs-TypeA-Position | PDSCH Mapping Type | K0 | S | L |
|---|---|---|---|---|---|
| 1 (Note 1) | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | | | Reserved | | |
| 7 | | | Reserved | | |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| 13 (Note 1) | 2,3 | Type B | 0 | 2 | 7 |
| 14 (Note 1) | 2 | Type A | 0 | 2 | 12 |
| | 3 | Type A | 0 | 3 | 11 |
| 15 | 2,3 | Type A | 0 | 0 | 6 |
| 16 | 2,3 | Type A | 0 | 2 | 6 |

Note 1: The UE may assume that this PSDCH resource allocation is not used, if the PDSCH was scheduled with SI-RNTI in PDCCH Type0 common search space

FIG. 20

REDUCED POWER CONSUMPTION BY OBTAINING TIME DOMAIN RESOURCE ALLOCATION PATTERNS IN ADVANCE VIA ADDITIONAL SIGNALING

PRIORITY CLAIM

This application claims benefit of priority of U.S. Provisional Patent Application Ser. No. 62/755,168 titled "Reduced Power Consumption by Obtaining Time Domain Resource Allocation Patterns in Advance via Additional Signaling", filed on Nov. 2, 2018, which is hereby incorporated by reference as though fully and completely set forth herein.

FIELD OF THE INVENTION

The present application relates to wireless communications, and more particularly to reducing the power consumption of devices such as wireless communication devices through additional signaling for obtaining time domain (wireless) resource allocation in advance, during wireless communications, e.g. during 3GPP LTE and/or NR communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

In general, wireless communication technologies, such as cellular communication technologies, are substantially designed to provide mobile communication capabilities to wireless devices. The ever increasing number of features and functionality introduced in wireless communication devices creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. The UEs, which may be mobile telephones or smart phones, portable gaming devices, laptops, wearable devices, PDAs, tablets, portable Internet devices, music players, data storage devices, or other handheld devices, etc. are generally powered by a portable power supply, e.g., a battery and may have multiple radio interfaces that enable support of multiple radio access technologies (RATs) as defined by the various wireless communication standards (LTE, LTE-A, NR, Wi-Fi, BLUETOOTH™, etc.). There are ongoing efforts not only to achieve efficient use of wireless communication resources and thereby increase system efficiency, but also to reduce power consumption required to perform wireless communications in order to improve the battery life of wireless devices.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, to reduce power consumption by obtaining time domain resource allocation patterns in advance through additional signaling, during wireless communications, e.g. during 3GPP LTE and/or NR communications. Embodiments are further presented herein for wireless communication systems containing wireless communication devices (UEs) and/or base stations and/or access points (APs) communicating with each other within the wireless communication systems.

Pursuant to the above, a device may obtain, through signaling between the device and a wireless network (e.g. between the device and a base station/eNB/gNB), a specified time-domain wireless-resource allocation pattern allocated to the device by the wireless network, with the specified resource allocation pattern associated with future wireless communications of the device for which the device has not yet decoded corresponding control information. In this manner, using signaling between the device and the network, the device may obtain a resource allocation pattern for a current transmit time interval (TTI, e.g. a slot or mini-slot in case of NR) in advance, before actually having to decode the control information for the current TTI. As a result, the device does not have to decode control information to identify the resource allocation pattern for the current TTI, and may thereby conduct wireless communications during the current TTI using resources allocated according to the (previously) obtained specified resource allocation pattern.

In some embodiments, the device may obtain the specified resource allocation pattern by receiving an indication from the network that the specified resource allocation pattern remains associated with the future wireless communications until indicated otherwise by the network, and/or by transmitting to the network an indication of preferred parameters associated with the future communications and further associated with the specified resource allocation pattern, and/or by transmitting to the network a request to have the network change from a different resource allocation pattern to the specified resource allocation pattern. The resource allocation pattern may be stored in a table by the wireless network, with the table including multiple entries, each entry representing a respective TWRA pattern, and a corresponding entry representing the specified resource allocation pattern.

In some embodiments, the device may obtain the specified resource allocation pattern by requesting the network to change from a presently selected entry of the multiple entries to the entry corresponding to the specified resource allocation pattern. The specified resource allocation pattern may facilitate reduced power use by the device with respect to a present resource allocation pattern to which the presently selected entry corresponds. In some embodiments, the device may obtain the specified resource allocation pattern by receiving an indication from the network that the corresponding entry from the table will remain selected until otherwise indicated to the device by the network. In some embodiments, the device may obtain the specified resource allocation pattern by transmitting to the network an indication of one or more preferred entries of the multiple entries included in the table. The device may first identify the respective resource allocation patterns corresponding to the one or more preferred entries as resource allocation patterns that provide power savings benefit to the UE, prior to transmitting the indication to the network. In some embodiments, the device may obtain the specified resource allocation pattern by transmitting to the network a capability report indicating power saving capabilities of the device.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 6 shows an exemplary table detailing fields contained in each entry of a time-domain wireless-resource allocation table, according to prior art;

FIG. 7 shows an exemplary table detailing the relationship between two of the fields detailed in FIG. 6, according to prior art;

FIG. 18 shows an exemplary table storing a first set of default time-domain resource allocation patterns, indicating preferred resource allocation patterns for reduced power use;

FIG. 19 shows an exemplary table storing a second set of default time-domain resource allocation patterns, indicating preferred resource allocation patterns for reduced power use; and FIG. 20 shows an exemplary table storing a second set of default time-domain resource allocation patterns, indicating preferred resource allocation patterns for reduced power use.

Figure 1:
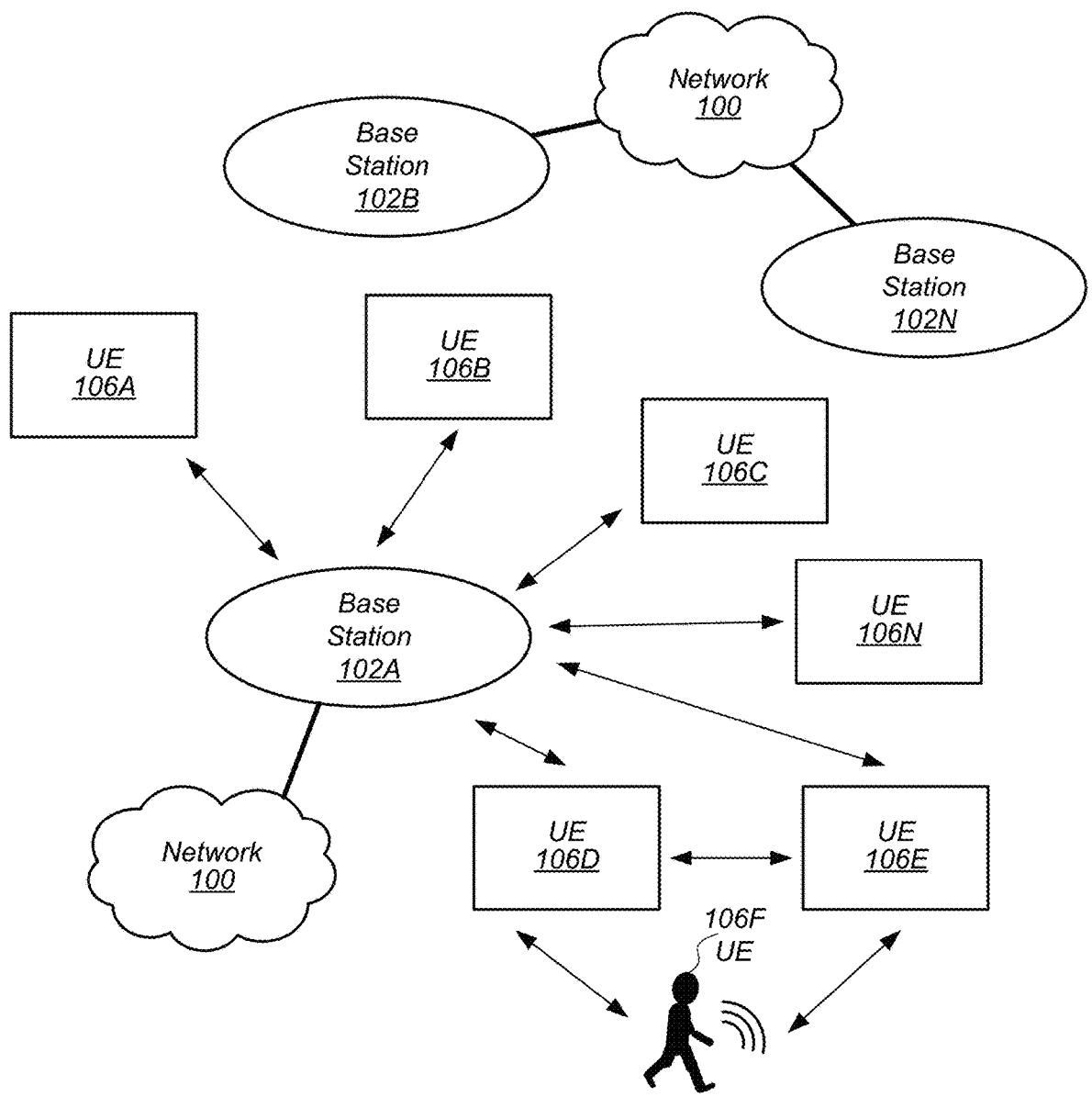
FIG. 1 illustrates an exemplary, simplified wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
AS: Access Stratum
BS: Base Station
BSR: Buffer Size Report
BSSID: Basic Service Set Identifier
CBRS: Citizens Broadband Radio Service
CBSD: Citizens Broadband Radio Service Device
CCA: Clear Channel Assessment
CMR: Change Mode Request
CS: Circuit Switched
DL: Downlink (from BS to UE)
DMRS: Demodulation Reference Signal
DSDS: Dual SIM Dual Standby DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MNO: Mobile Network Operator
NAS: Non-Access Stratum
NB: Narrowband
OOS: Out of Sync
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PT: Payload Type
QBSS: Quality of Service Enhanced Basic Service Set
QI: Quality Indicator
RAN: Radio Access Network
RAT: Radio Access Technology
RF: Radio Frequency
ROHC: Robust Header Compression
RRC: Radio Resource Control
RTP: Real-time Transport Protocol
RTT: Round Trip Time
RX: Reception/Receive
SAS: Spectrum Allocation Server
SI: System Information
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TX: Transmission/Transmit
UE: User Equipment
UI: User Interface
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN
Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
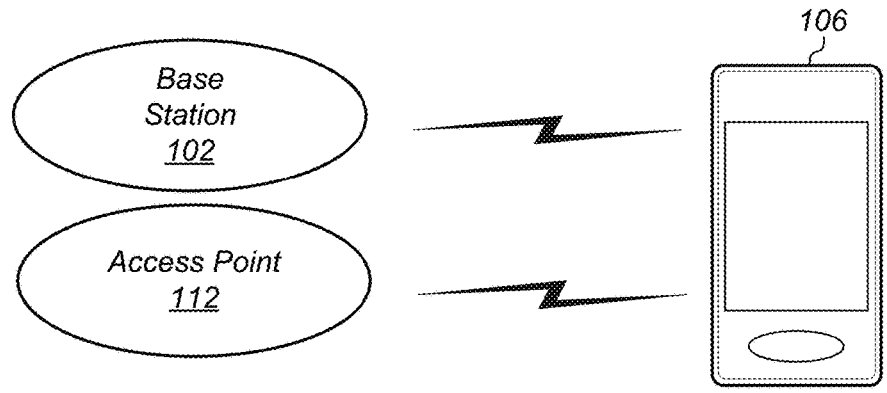
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base stations 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UEs 106. Various ones of the UE devices may operate with reduced power consumption by obtaining time domain (wireless) resource allocation patterns in advance through additional signaling during wireless communications, e.g. during 3GPP LTE and/or NR communications, according to various embodiments disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may also be considered at least a part of the UE communicating on the network or over the network.

The base stations 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if a base station is implemented in the context of LTE, it may alternately be referred to as an 'eNodeB' or 'eNB', and if it is implemented in the context of 5G NR, it may alternately be referred to as 'gNodeB' or 'gNB'. In some embodiments, base station 102A (e.g. an eNB in an LTE network or a gNB in an NR network) may communicate with UEs that operate with reduced power consumption by obtaining time domain (wireless) resource allocation patterns in advance through additional signaling during wireless communications, e.g. during 3GPP LTE and/or NR communications, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/embodiments under consideration.

UEs 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base stations 102 and other similar base stations operating according to the same or a different cellular communication standard may thus be provided as one or more networks of cells, which may provide continuous or nearly continuous overlapping service to UEs 106 and similar devices over a wide geographic area via one or more cellular communication standards.

Thus, while base station 102A may act as a "serving cell" for UEs 106A-N as illustrated in FIG. 1, each one of UEs 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UEs 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UEs 106 communicating with a network may therefore be interpreted as the UEs 106 communicating with one or more network nodes considered to be a part of the network and which may interact with the UEs 106 to conduct communications with the UEs 106 and in some cases affect at least some of the communication parameters and/or use of communication resources of the UEs 106.

Furthermore, as also illustrated in FIG. 1, at least some of the UEs 106, e.g. 106D and 106E may represent vehicles communicating with each other and with base station 102A, via cellular communications such as 3GPP LTE and/or 5G-NR for example. In addition, UE 106F may represent a pedestrian who is communicating and/or interacting with the vehicles represented by UEs 106D and 106E in a similar manner. Various aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106A through 106N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using LTE or CDMA2000 1×RTT or NR, and/or communicating using each of Wi-Fi and BLUETOOTH™. Other configurations are also possible.

Figure 3:
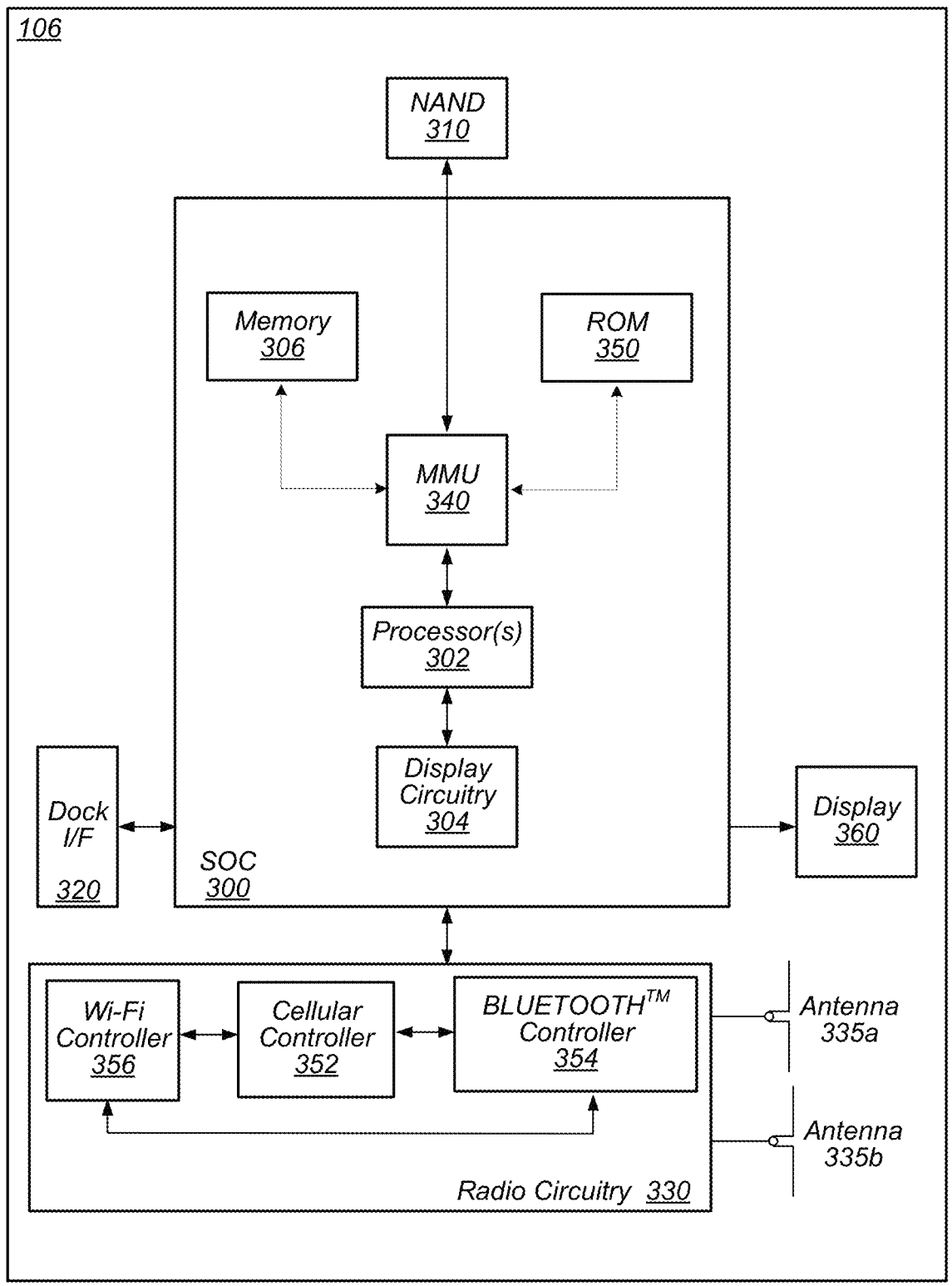
FIG. 3 illustrates an exemplary, simplified block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to operate with reduced power consumption by obtaining time domain (wireless) resource allocation patterns in advance through additional signaling during wireless communications, e.g. during 3GPP LTE and/or NR communications, as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to operate with reduced power consumption by obtaining time domain (wireless) resource allocation patterns in advance through additional signaling during wireless communications, according to various embodiments disclosed herein. Processor(s) 302 may also implement various other applications and/or end-user applications running on UE 106.

Figure 5:
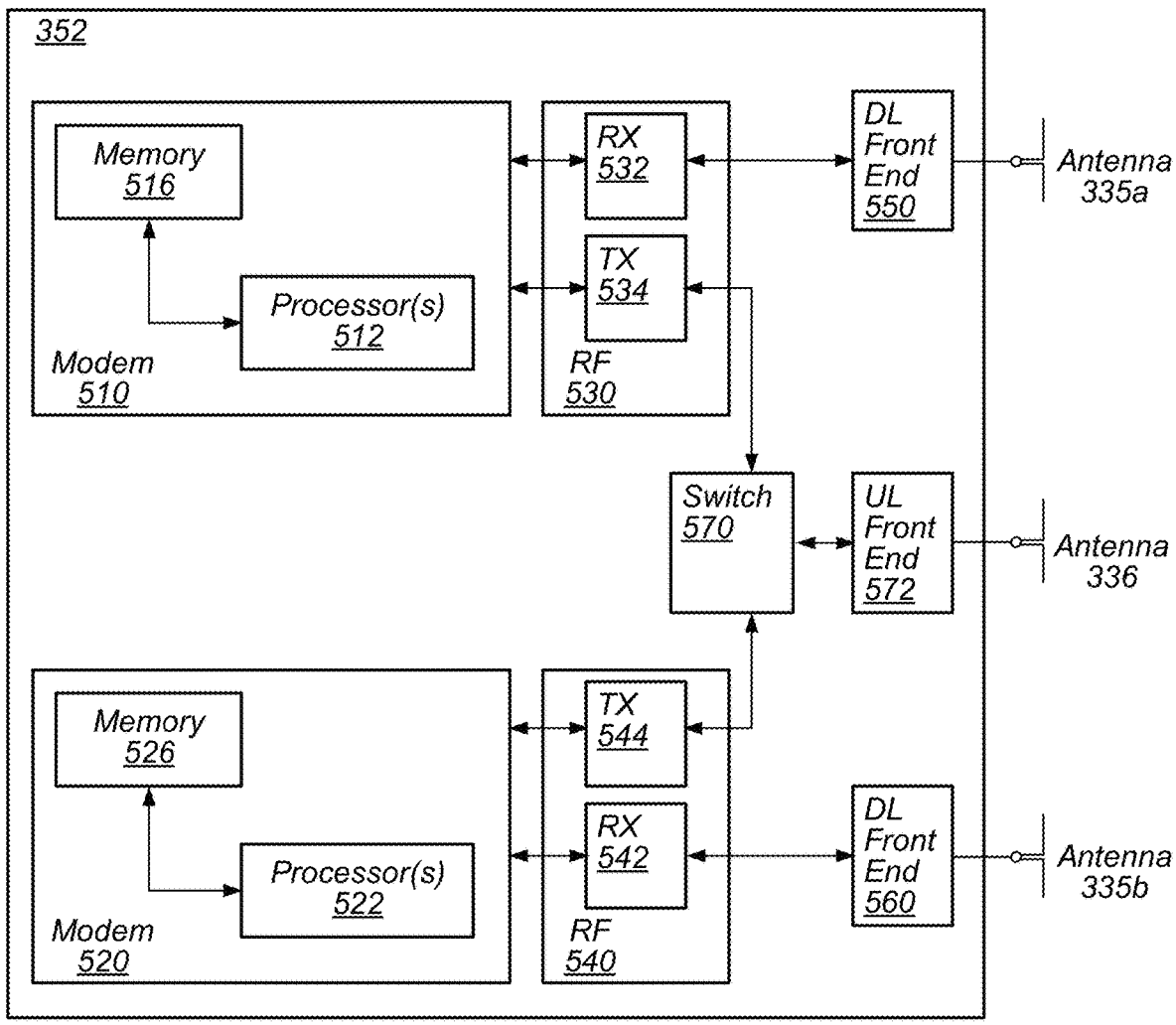
FIG. 5 shows an exemplary, simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
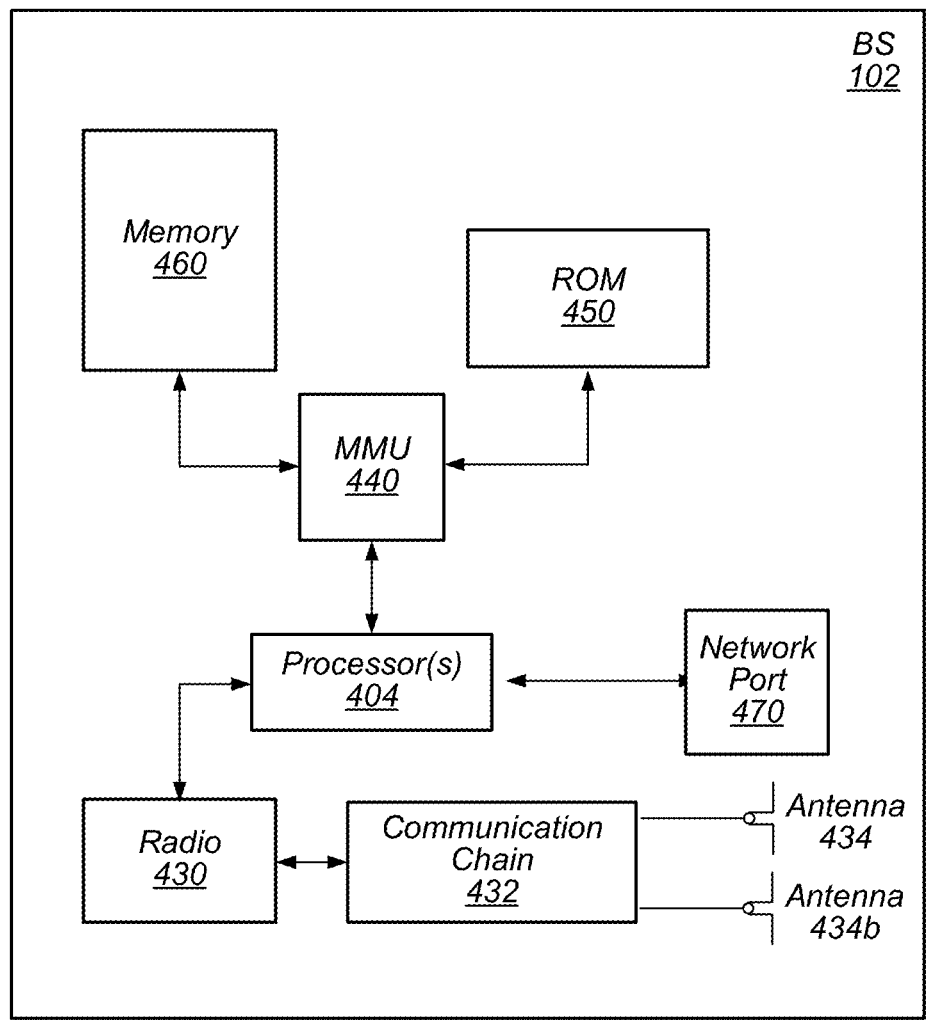
FIG. 4 illustrates an exemplary, simplified block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434*a* and 434*b*) for performing wireless communication with mobile devices and/or other devices. Antennas 434*a* and 434*b* are shown by way of example, and base station 102 may include fewer or more antennas. Overall, the one or more antennas are collectively referred to as antenna(s) 434. Antenna(s) 434 may be configured to operate as a wireless transceiver and may be further configured to communicate with UE devices 106 via radio circuitry 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device that may operate with reduced power consumption by obtaining time domain (wireless) resource allocation patterns in advance through additional signaling, during wireless communications, e.g. during 3GPP LTE and/or NR communications. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for communicating with UE devices that operate with reduced power consumption by obtaining time domain (wireless) resource allocation patterns in advance through additional signaling during wireless communications, as disclosed herein.

FIG. 5—Block Diagram of Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Reducing Power Consumption via Additional Signaling for Time Domain Resource Allocation As previously mentioned, various devices, which may be mobile telephones or smart phones, portable gaming devices, laptops, wearable devices, PDAs, tablets, portable Internet devices, music players, data storage devices, or additional handheld devices, are generally powered by a portable power supply, e.g., a battery and may have multiple radio interfaces that enable support of multiple radio access technologies (RATs). Ongoing efforts are being made to reduce power consumption as much as possible to prolong the operating time of the device on a single battery charge.

Some communication standards, e.g. 3GPP NR specification, define extremely flexible time-domain wireless-resource allocation patterns, e.g. flexible PDCCH (physical downlink control channel)/PDSCH (physical downlink shared channel) time-domain resource allocation patterns. The radio resource control (RRC) configures a table including a list of possible (e.g. up-to 16) time-domain (wireless) resource allocation patterns per bandwidth part (BWP). A carrier BWP is a contiguous set of physical resource blocks selected from a contiguous subset of the common resource blocks for a given numerology on a given carrier. For downlink, the UE may be configured with up to several carrier BWPs (one example is four BWPs, per current specifications), with only one BWP per carrier active at a given time. For uplink, the UE may similarly be configured with up to several (e.g. four) carrier BWPs, with only one BWP per carrier active at a given time. If a UE is configured with a supplementary uplink, then the UE may be additionally configured with up to the specified number (e.g. four) carrier BWPs in the supplementary uplink, with only one carrier BWP active at a given time.

The data control information (DCI) in the PDCCH carries an index to the table, indicating to UE what (time-domain wireless-resource) allocation will be used in a current transmit time interval (TTI). In NR, a frame consists of ten (10) subframes, with each frame having a specified duration (e.g. 1 ms duration similar to LTE). Each subframe consists of 2 mini-slots. Each slot can have a specified number of symbols, e.g. either 14 (normal cyclic prefix, CP) or 12 (extended CP) OFDM symbols. A slot is designated as a typical unit (e.g. a TTI) for transmission used by the scheduling mechanism. NR permits transmission to start at any OFDM symbol, and last for as many symbols as required for the communication. This is known as a "mini-slot" transmission, which facilitates very low latency for critical data communications and minimizes interference to other radio frequency (RF) links. Mini-slots help achieve lower latency in 5G NR architecture. In slot-based scheduling, one slot is the possible scheduling unit (e.g. TTI) and slot aggregation is also allowed. The slot length scales with subcarrier spacing. A mini-slot occupies a specified number of symbols, e.g. 2, 4 or 7 OFDM symbols. It enables non-slot-based scheduling, and is the minimum scheduling unit used in 5G NR. As mentioned above, mini-slots can occupy as little as 2 OFDM symbols and are variable in length, and can be positioned asynchronously with respect to the beginning of a standard slot. In theory, the allocation pattern could change from slot to slot, and the UE customarily obtains the pattern used for the current TTI by decoding the DCI, which means decoding the PDCCH.

FIG. 6 shows an exemplary table detailing fields contained in each entry of a time-domain wireless-resource allocation table, according to prior art. More specifically, as indicated in FIG. 6, each entry of the table contains an information element (IE) called PDSCH-time Domain Resource Allocation, which includes 3 fields:

K0: indicates a distance between the physical control channel (e.g. PDCCH) and its corresponding physical data channel (e.g. PDSCH), typically denoted in number of slots;

Mapping Type: indicates whether the scheduling is slot-based or mini-slot-based; and Start Symbol and Length: indicates the physical data channel start symbol and length (e.g. PDSCH start symbol index and length, typically denoted in number of symbols).

The "Mapping Type" and "Start Symbol and Length" are jointly determined, based on the table shown in FIG. 7 (which shows a normal cyclic prefix, CP, table as an example). For slot transmissions, the starting index is less flexible while the length is flexible, whereas for mini-slot transmissions, the starting index is flexible while the length is less flexible.

As mentioned above, in order to determine which entry (which time-domain wireless-resource allocation pattern) to use from the resource allocation table for the current TTI (e.g. for the current slot or current mini-slot), the UE currently needs to decode the PDCCH first. However, if the UE had already obtained the time-domain resource allocation pattern in advance, for example before decoding the corresponding control information (e.g. before decoding PDCCH), multiple patterns may be identified, even for same-slot scheduling, which may facilitate reduced power usage by the UE, or provide power saving benefits to the UE.

Communication Scenarios

FIGS. 8 through 16 provide examples of some communication scenarios in which power savings may be achieved by the UE when the UE obtains the time-domain (wireless) resource allocation pattern(s) in advance as discussed above. In the example scenarios provided in FIGS. 8 to 16, the PDCCH length is assumed to be one (1) symbol, decoding of PDCCH is assumed to take an additional three (3) symbols, the PDSCH length is assumed to be two (2) or four (4) symbols, and decoding of PDSCH is assumed to take an additional two (2) symbols. In each example scenario, two consecutive slots are shown. Each case illustrates a downlink (DL) grant present in the first slot and no DL grant present in the second slot. The horizontal numbering in each diagram refers to the symbols, with each diagram illustrating two slots, and each slot spanning fourteen (14) symbols numbered 0 through 13. The various specific lengths and values provided in these examples are for the purposes of illustration, and alternate embodiments may feature different values when implementing the additional signaling for obtaining time domain (wireless) resource allocation in advance as disclosed herein.

Scenario 1

Figure 8:
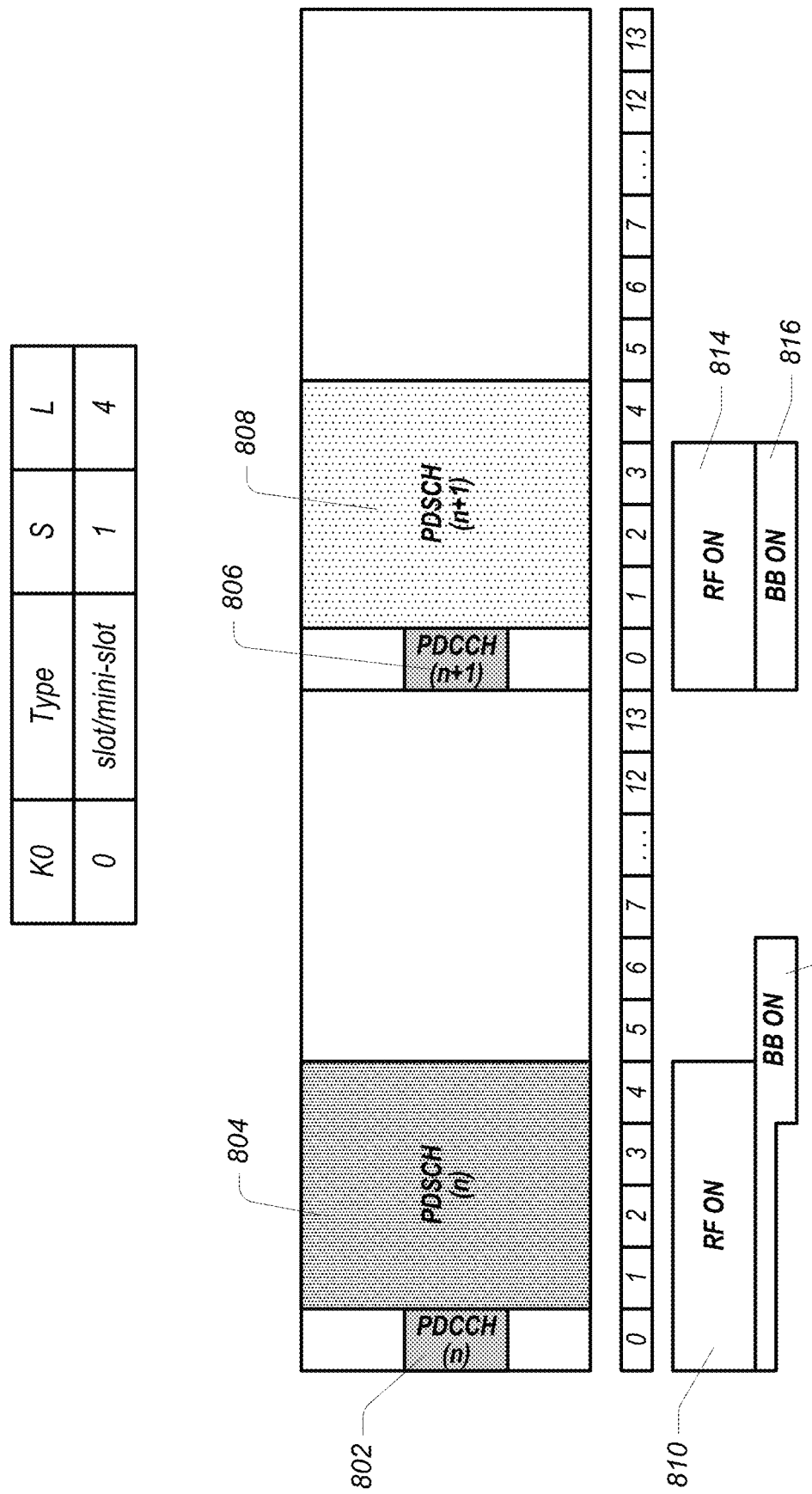
FIG. 8 shows an exemplary diagram illustrating use of radio hardware and baseband hardware for baseline wireless transmissions, according to prior art.

FIG. 8 shows an exemplary diagram illustrating the use of radio hardware resources and baseband hardware resources for baseline wireless transmissions, according to prior art. As indicated in the figure, the RF (circuitry) is powered (i.e. uses power) during five (5) symbols in the first slot (810) to decode physical control channel 802 and also decode physical data channel 804 since a DL grant is present (as noted above), and during four (4) symbols in the second slot (814) to decode physical control channel 806 without having to decode physical data channel 808 since no DL grant is present. The baseband (BB) circuitry is powered during seven (7) symbols in the first slot (812) and during four (4) symbols in the second slot (816). Because the physical data channels 804 and 808 each occupy 4 symbols and there is no separation between the physical control channels 802/806 and the corresponding physical data channels 804/808, respectively, there is not a significant power saving opportunity for the UE in this scenario.

Scenario 2

Figure 9:
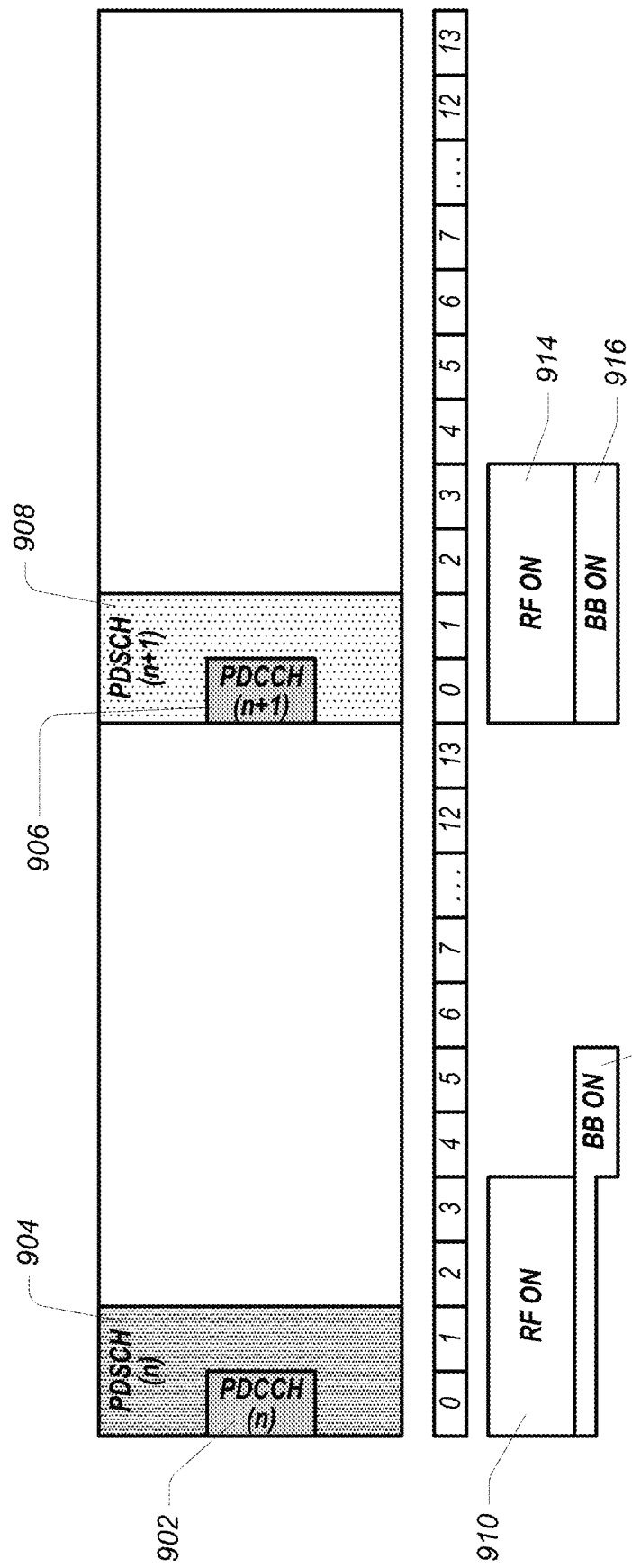
FIG. 9 shows an exemplary diagram illustrating use of radio hardware and baseband hardware for same-slot short packet wireless transmissions, according to prior art.

FIG. 9 shows an exemplary diagram illustrating use of radio hardware resources and baseband hardware resources for same-slot short packet wireless transmissions, according to prior art. As indicated in the figure, the RF (circuitry) is powered during four (4) symbols in both the first slot (910) and in the second slot (914), while the BB circuitry is powered during six (6) symbols in the first slot (912) and during four (4) symbols in the second slot (916). Since the physical data channels 904 and 908 each occupy only two (2) symbols and the physical control channels 902 and 906 each occupy one (1) symbol, the UE may achieve power savings, or reduced power usage, by obtaining the resource allocation pattern (e.g. obtaining parameters corresponding to the resource allocation pattern) in advance, for both a scheduled slot (with a DL grant, which is illustrated as the first slot) and a non-scheduled slot (without a DL grant, which is illustrated as the second slot), in this scenario.

Figure 10:
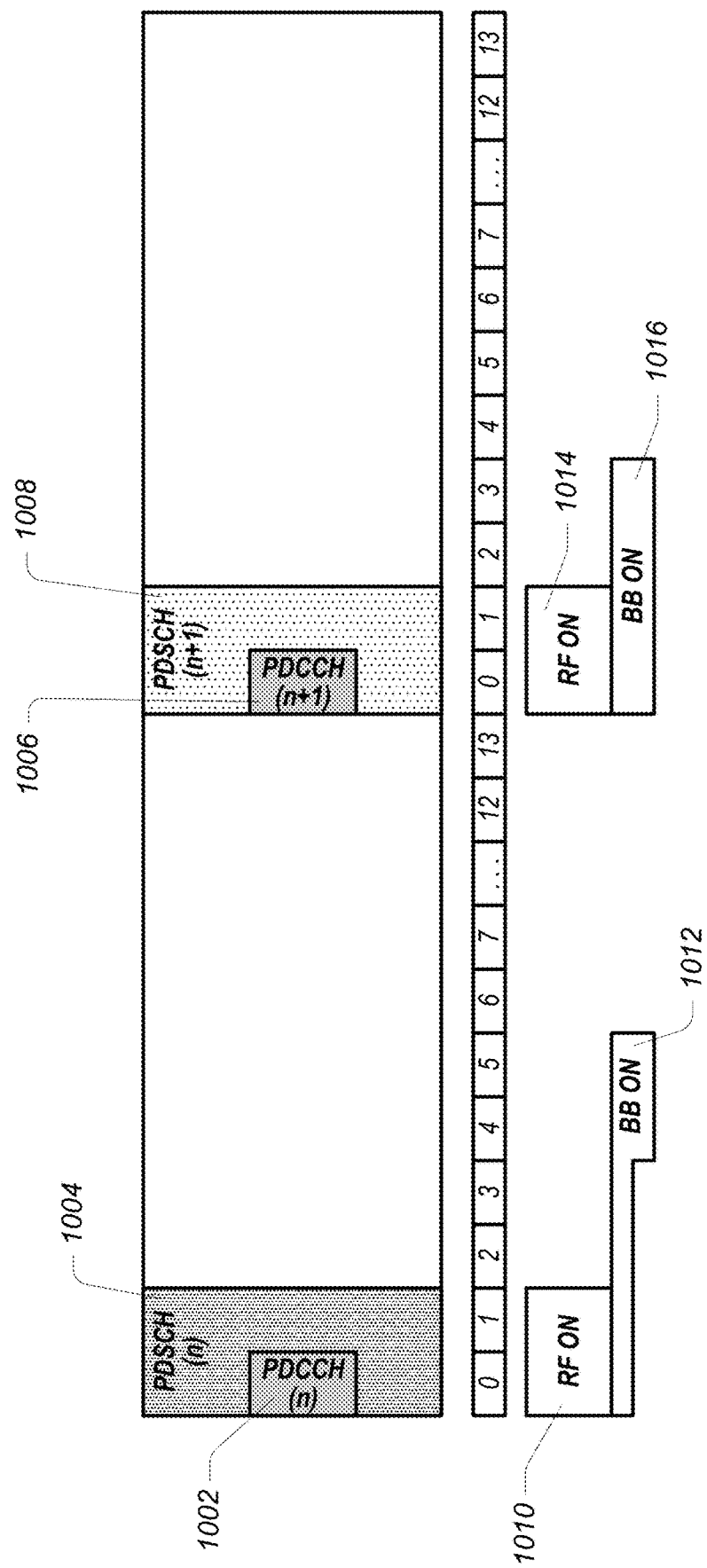
FIG. 10 shows an exemplary diagram illustrating reduced power use of radio hardware and baseband hardware for same-slot short packet wireless transmissions, according to some embodiments.

The advantage of obtaining the resource allocation pattern in advance is illustrated in FIG. 10, which shows an exemplary diagram illustrating reduced power use of radio hardware resources and baseband hardware resources for same-slot short packet wireless transmissions corresponding to FIG. 9. As indicated in FIG. 10, the RF (circuitry) is powered only during two (2) symbols in both the first slot (1010) and in the second slot (1014), while the baseband (BB) circuitry remains powered during six (6) symbols in the first slot (1012) and during four (4) symbols in the second slot (1016), resulting in power savings during operation of the UE. Transmission of physical control channels 1002 and 1006 and physical data channels 1004 and 1008 is the same as the transmission of physical control channels 902 and 906 and physical data channels 904 and 908 in FIG. 9.

Scenario 3

Figure 11:
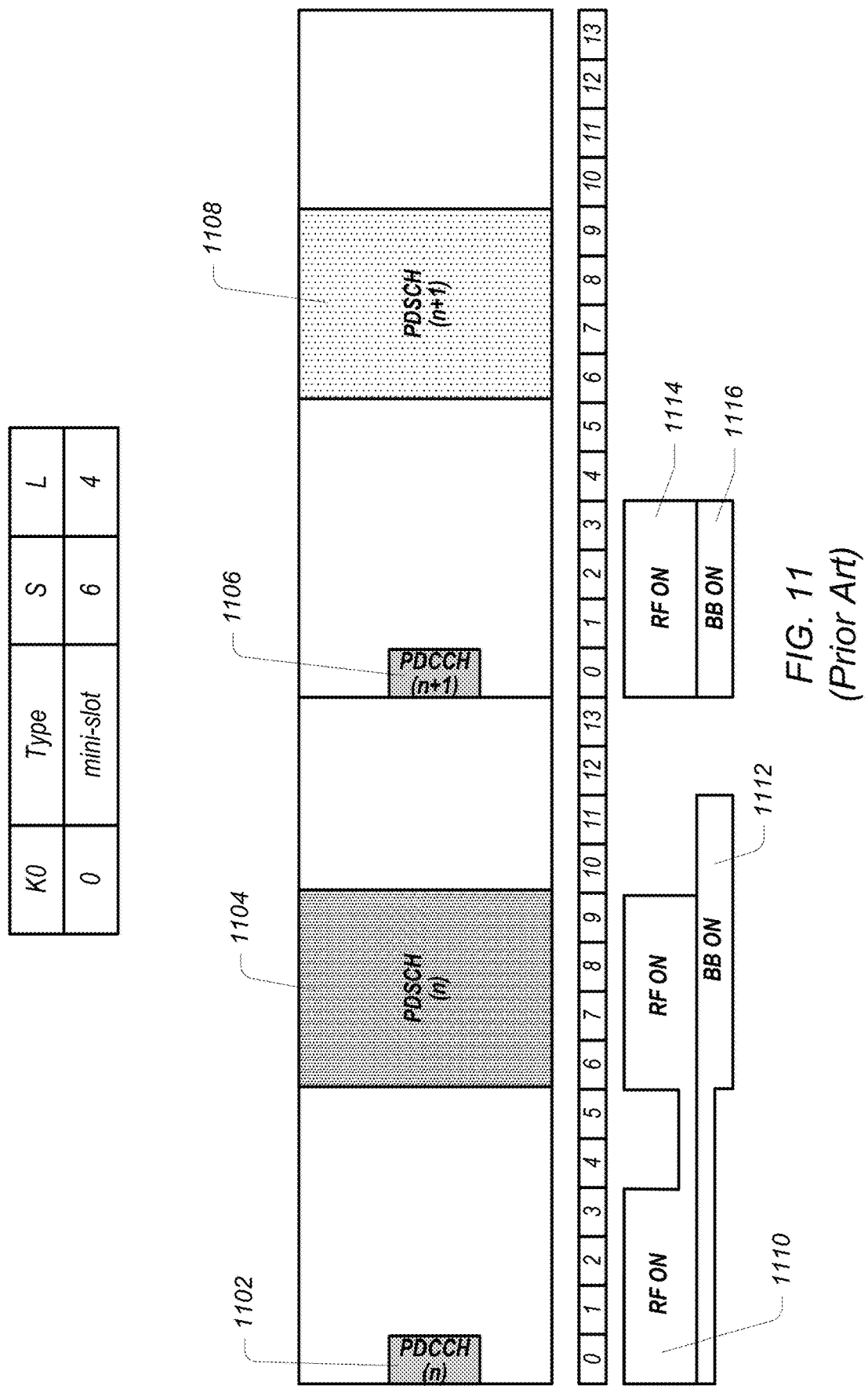
FIG. 11 shows an exemplary diagram illustrating use of radio hardware and baseband hardware for same-slot scattered allocation transmissions, according to prior art.

FIG. 11 shows an exemplary diagram illustrating use of radio hardware resources and baseband hardware resources for same-slot scattered allocation wireless transmissions, according to prior art. As indicated in the figure, the RF (circuitry) is powered during a total of ten (10) symbols in the first slot (1110) and during four (4) symbols in the second slot (1114), while the BB circuitry is powered during twelve (12) symbols in the first slot (1112) and during four (4)

symbols in the second slot (1116). Since the physical data channels 1104/1108 are separated from their corresponding physical control channels 1102/1106, respectively, by five (5) symbols, but each physical data channel occupies only four (4) symbols, the UE may achieve power savings, or reduced power usage, by obtaining the resource allocation pattern (e.g. obtaining parameters corresponding to the resource allocation pattern) in advance, for both a scheduled slot (with a DL grant, which is illustrated as the first slot) and a non-scheduled slot (without a DL grant, which is illustrated as the second slot), in this scenario.

Figure 12:
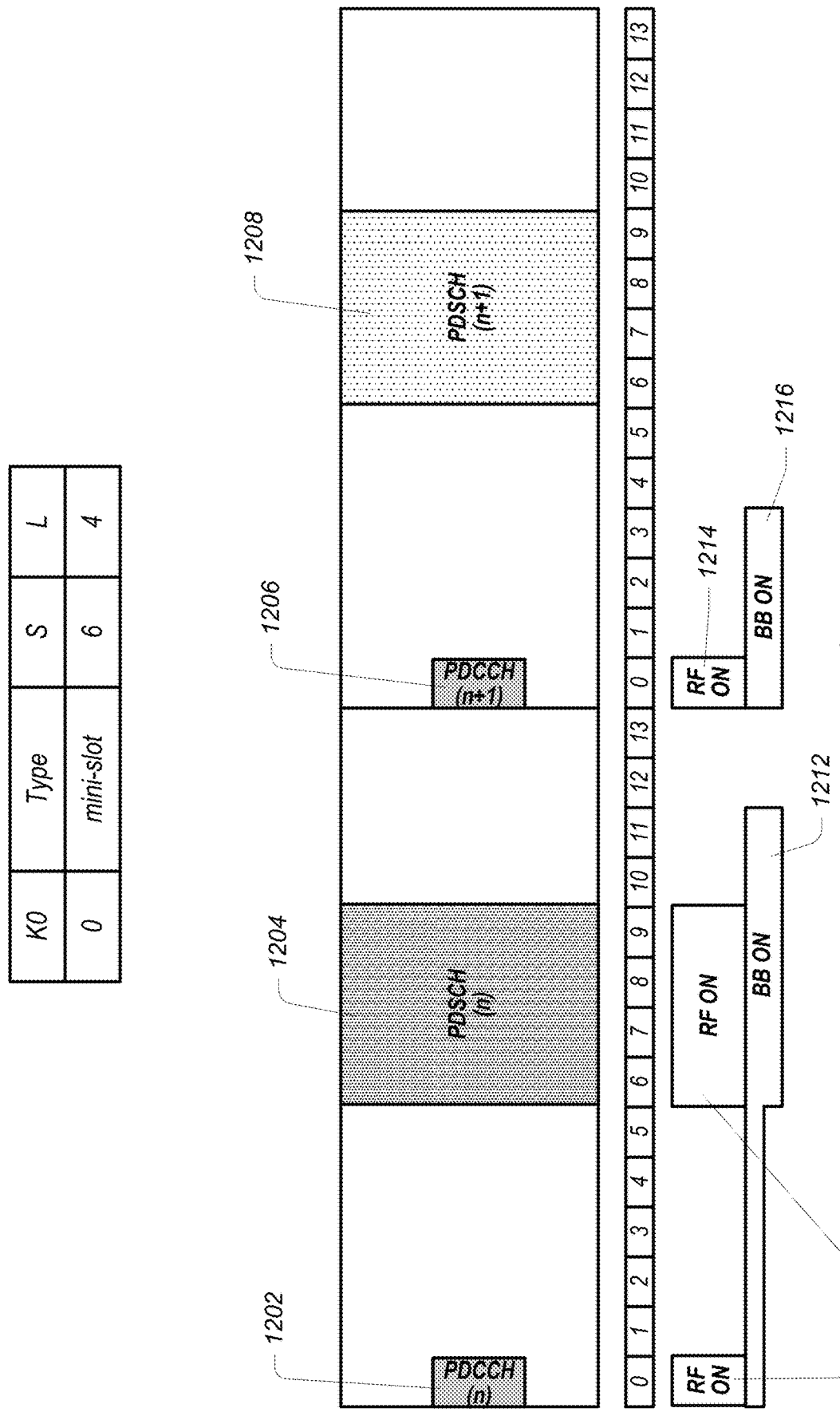
FIG. 12 shows an exemplary diagram illustrating reduced power use of radio hardware and baseband hardware for same-slot scattered allocation transmissions, according to some embodiments.

The advantage of obtaining the resource allocation pattern in advance is illustrated in FIG. 12, which shows an exemplary diagram illustrating reduced power use of radio hardware resources and baseband hardware resources for same-slot scattered allocation transmissions corresponding to FIG. 11. As indicated in FIG. 12, the RF (circuitry) is powered only during a total of five (5) symbols in the first slot (1210) and during a single symbol in the second slot (1214), while the baseband (BB) circuitry is powered during twelve (12) symbols in the first slot (1212) and during four (4) symbols in the second slot (1216), resulting in power savings during operation of the UE.

Scenario 4

Figure 13:
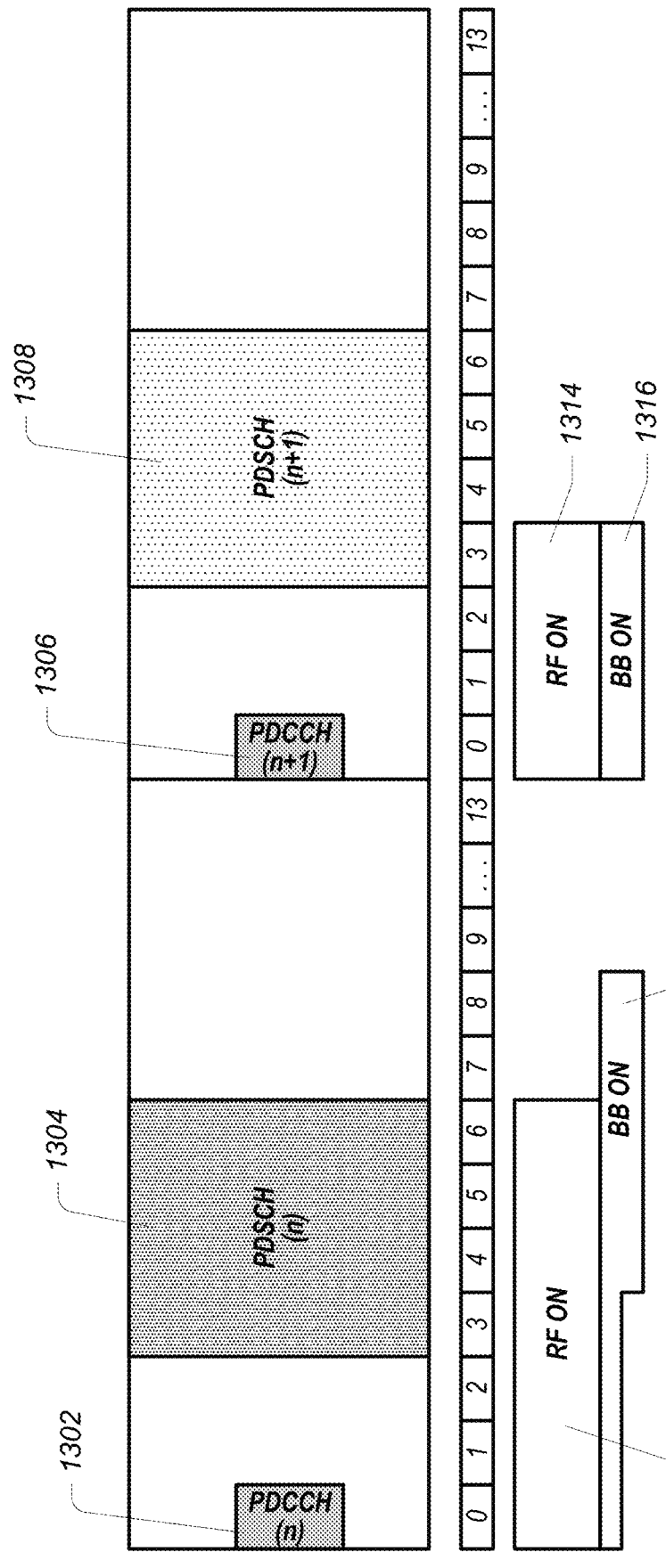
FIG. 13 shows an exemplary diagram illustrating use of radio hardware and baseband hardware for cross-slot scattered allocation transmissions, according to prior art.

FIG. 13 shows an exemplary diagram illustrating use of radio hardware resources and baseband hardware resources for cross-slot scattered allocation transmissions, according to prior art. As indicated in the figure, the RF (circuitry) is powered during a total of seven (7) symbols in the first slot (1310) and during four (4) symbols in the second slot (1314), while the BB circuitry is powered during nine (9) symbols in the first slot (1312) and during four (4) symbols in the second slot (1316). Since the physical data channels (1304 and 1308) are separated from their corresponding physical control channels (1302 and 1306, respectively) by two (2) symbols, but each physical control channel occupies only four (4) symbols, the UE may achieve power savings, or reduced power usage, by obtaining the resource allocation pattern (e.g. obtaining parameters corresponding to the resource allocation pattern) in advance, for both a scheduled slot (with a DL grant, which is illustrated as the first slot) and a non-scheduled slot (without a DL grant, which is illustrated as the second slot), in this scenario.

Figure 14:
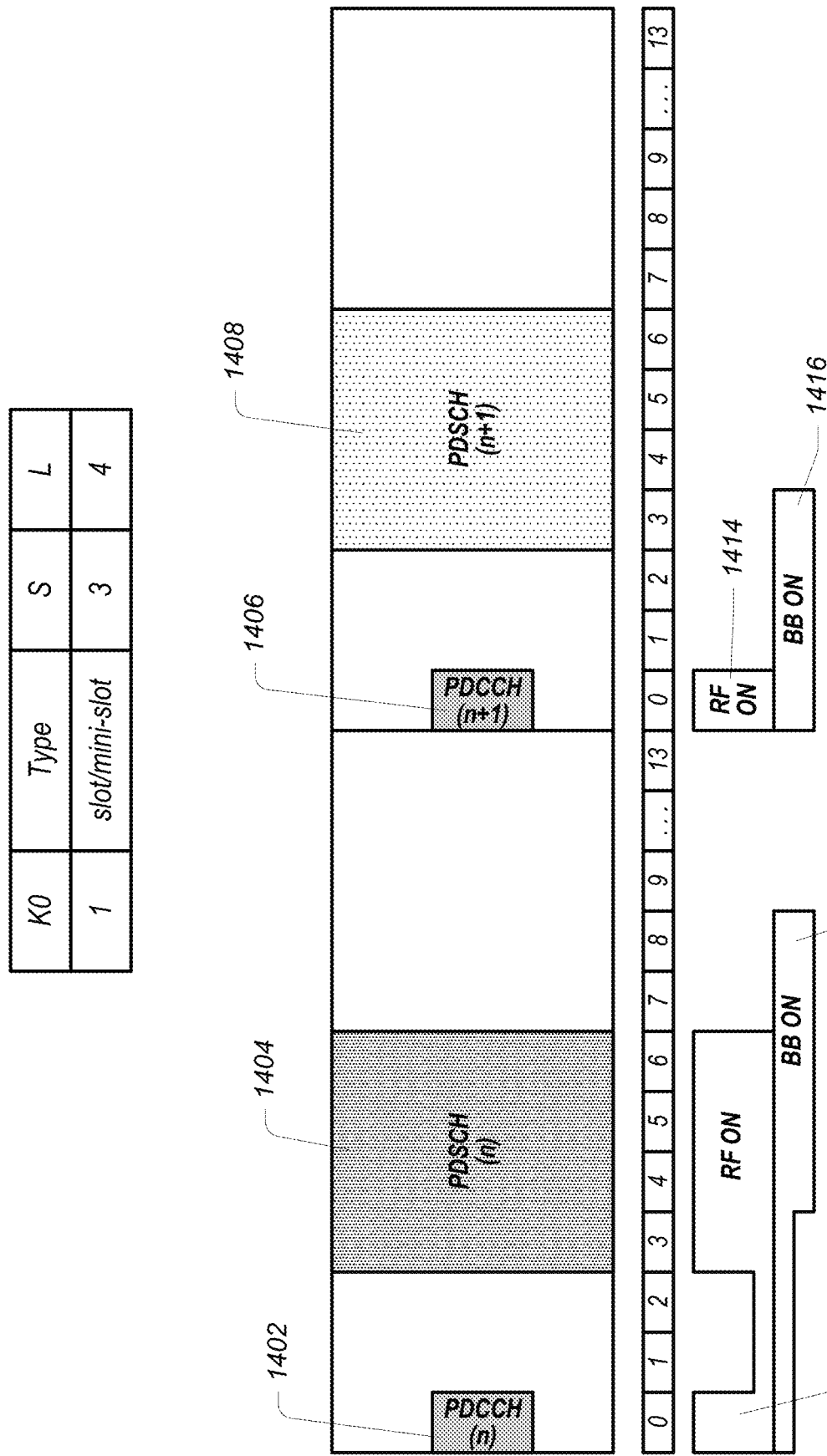
FIG. 14 shows an exemplary diagram illustrating reduced power use of radio hardware and baseband hardware for cross-slot scattered allocation transmissions, according to some embodiments.

The advantage of obtaining the resource allocation pattern in advance is illustrated in FIG. 14, which shows an exemplary diagram illustrating reduced power use of radio hardware and baseband hardware for cross-slot scattered allocation transmissions corresponding to FIG. 13. As indicated in FIG. 14, the RF (circuitry) is fully powered only during a total of five (5) symbols in the first slot (1410) and during a single symbol in the second slot (1414), while the baseband (BB) circuitry is powered during nine (9) symbols in the first slot (1412) and during four (4) symbols in the second slot (1416), resulting in power savings during operation of the UE. Transmission of physical control channels 1402 and 1406 and physical data channels 1404 and 1408 is the same as the transmission of physical control channels 1302 and 1306 and physical data channels 1304 and 1308 in FIG. 13.

Scenario 5

Figure 15:
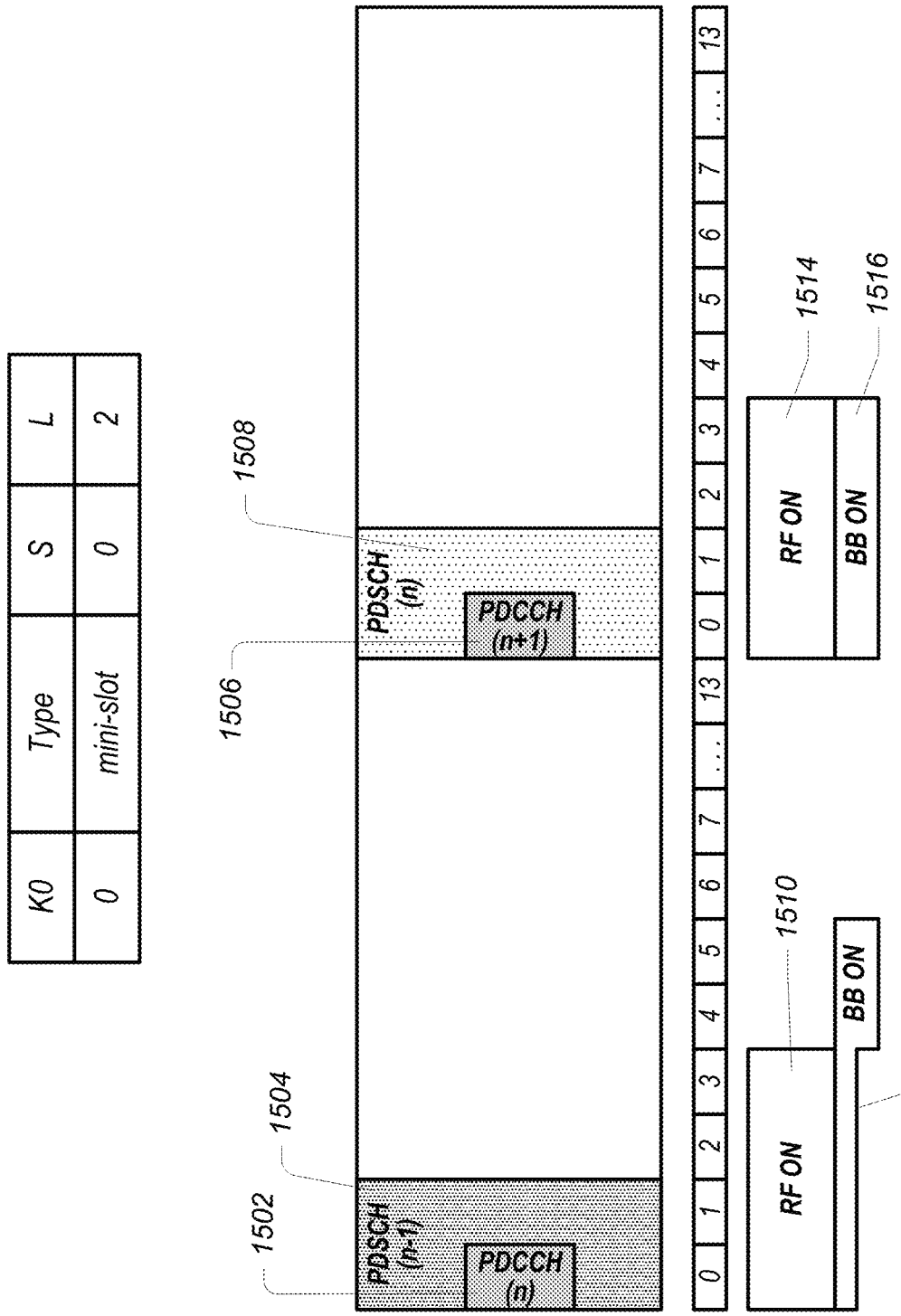
FIG. 15 shows an exemplary diagram illustrating use of radio hardware and baseband hardware for cross-slot short packet transmissions, according to prior art.

FIG. 15 shows an exemplary diagram illustrating use of radio hardware and baseband hardware for cross-slot short packet transmissions, according to prior art. As indicated in the figure, the RF (circuitry) is powered during four (4) symbols in the first slot (1510) and during four (4) symbols in the second slot (1514), while the BB circuitry is powered during six (6) symbols in the first slot (1512) and during four (4) symbols in the second slot (1516). Since the physical data channels 1504 and 1508 each occupy only two (2) symbols, the UE may achieve power savings, or reduced power usage, by obtaining the resource allocation pattern (e.g. obtaining parameters corresponding to the resource allocation pattern) in advance, for both a scheduled slot (with a DL grant, which is illustrated as the first slot) and a non-scheduled slot (without a DL grant, which is illustrated as the second slot), in this scenario.

Figure 16:
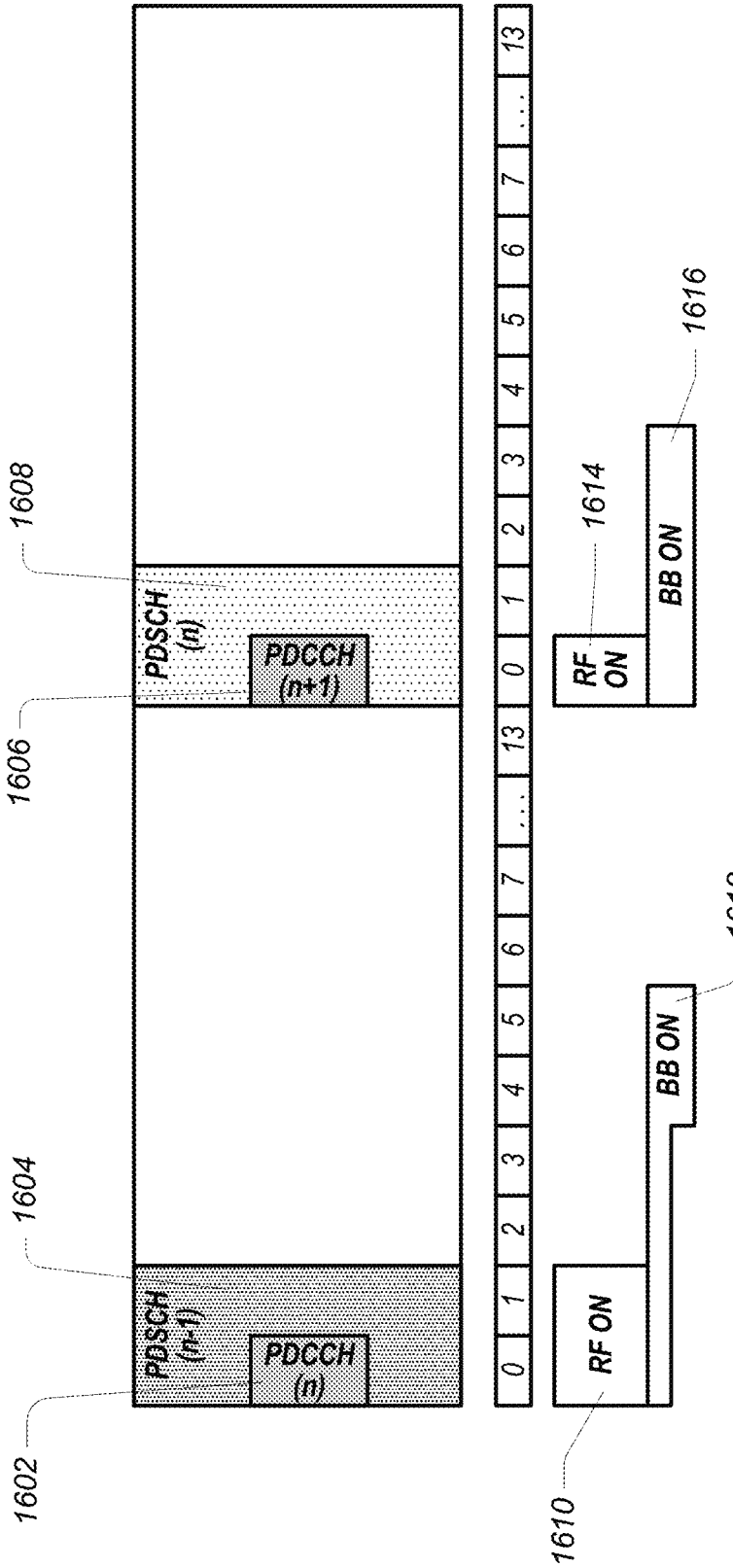
FIG. 16 shows an exemplary diagram illustrating reduced power use of radio hardware and baseband hardware for cross-slot short packet transmissions, according to some embodiments.

The advantage of obtaining the resource allocation pattern in advance is illustrated in FIG. 16, which shows an exemplary diagram illustrating reduced power use of radio hardware and baseband hardware for cross-slot short packet transmissions corresponding to FIG. 15. As indicated in FIG. 16, the RF (circuitry) is powered only during a total of two (2) symbols in the first slot (1610) and during a single symbol in the second slot (1614), while the baseband (BB) circuitry is powered during six (6) symbols in the first slot (1612) and during four (4) symbols in the second slot (1616), resulting in power savings during operation of the UE. Transmission of physical control channels 1602 and 1606 and physical data channels 1604 and 1608 is the same as the transmission of physical control channels 1502 and 1506 and physical data channels 1504 and 1508 in FIG. 15.

Reduced Power Usage by Obtaining Resource Allocation Patterns in Advance via Signaling As previously described, in order to realize the power savings illustrated in FIGS. 10, 12, 14, and 16, the UE may obtain the parameters for the resource allocations, or the resource allocation pattern, in advance, e.g. before decoding the physical control channel for the corresponding TTI (e.g. slot or mini-slot). Based on the current standard, this may be possible only if RRC configured the table with a single entry, that is, if each entry in the table were configured to have the same value. However, each resource allocation is configured as the single pattern for the BWP, and to change resource allocation the UE has to switch to a different BWP. Accordingly, having only a single entry (e.g. by making all 16 entries the same) may have drawbacks. For example, such a configuration may remove almost all the flexibilities of time-domain resource allocation defined in the standard. There may be many different resource allocation patterns (for different purposes), but there may not be enough BWPs to support them. While BWPs may be utilized for many important purposes, the single-entry approach would reduce the use of BWPs just for different time-domain resource allocations. Furthermore, multiple BWPs represent an optional feature which may not be supported by infra or UE vendors at least in initial deployment phase(s) of NR technology. Therefore, it is desirable to provide the UE with power saving benefits even without multiple BWP support.

Figure 17:
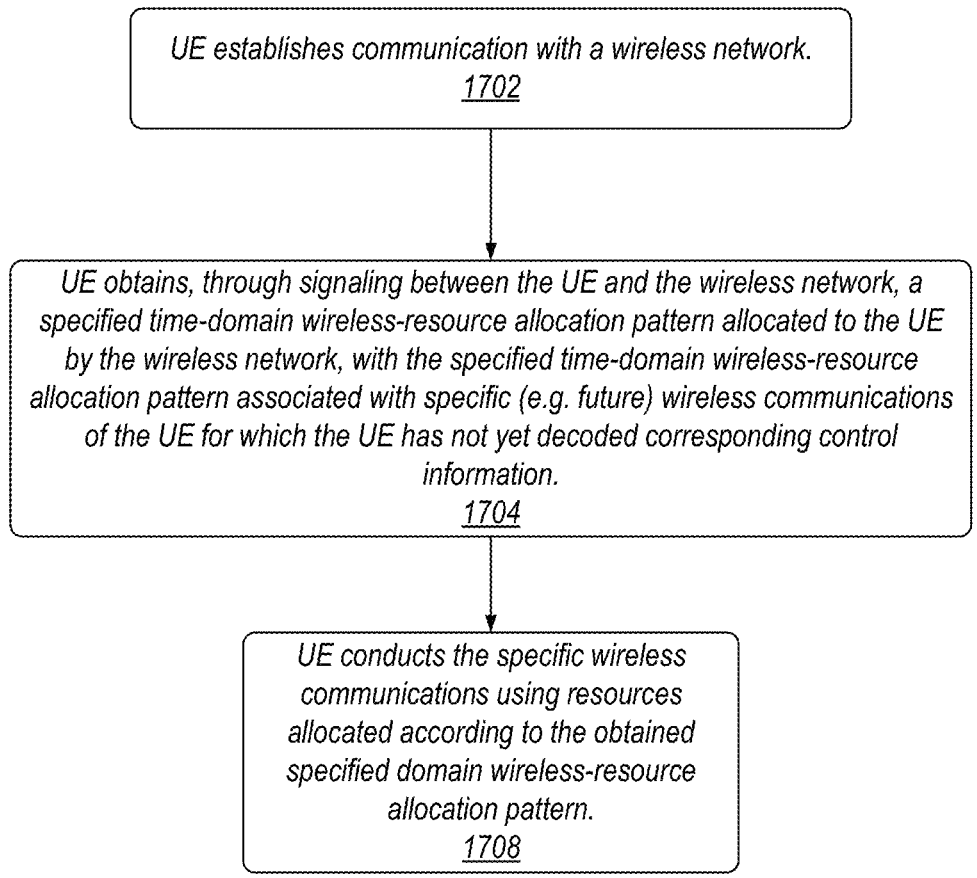
FIG. 17 shows a flow diagram of an exemplary method to reduce power consumption in a device by obtaining time-domain wireless-resource allocation patterns in advance via additional signaling, according to some embodiments.

FIG. 17 shows a flow diagram of an exemplary method that facilitates a device, e.g. a UE, reducing its power consumption by obtaining time-domain wireless-resource allocation patterns, for example for a current TTI, in advance via additional signaling. A device may establish communication with a wireless network (1702). Such communication may include forms of communication as described above with respect to FIGS. 1-5, for example. The UE may obtain, through signaling between the UE and the wireless network, a specified time-domain wireless-resource allocation pattern configured for the UE by the wireless network, with the specified time-domain wireless-resource allocation pattern associated with specific (e.g. future) wireless communications of the UE for which the UE has not yet decoded corresponding control information (1704). For example, the UE may obtain the specified time-domain wireless-resource allocation pattern for a given TTI, e.g. a current TTI, which may be a slot or mini-slot in NR communications, prior to the UE decoding control information associated with or corresponding to the given TTI. In this manner the UE has advance knowledge of the resource allocation for the given TTI prior to decoding the control information (e.g. before decoding a physical control channel such as PDCCH) for the given TTI. The UE may then conduct the specific wireless communications using resources allocated according to the obtained specified domain wireless-resource allocation pattern (1708). This allows the UE to power down one or more hardware circuits or circuit components when conducting the future communications, which would not have been possible if the UE had to decode the corresponding control information first in order to identify the resource allocation(s) for the given TTI (for example for the current TTI).

Signaling Options

Typically, a time-domain resource allocation may be something relatively static, e.g., application dependent. Therefore, the RRC may still configure the table with multiple entries as usual (e.g., for multiple applications, as illustrated by examples provided in FIGS. 18-20), and additional signaling between the UE and the network may be used to facilitate the UE obtaining the resource allocation patterns or resource allocation parameters in advance for a TTI (e.g. for a slot or mini-slot) prior to having to decode the physical control channel corresponding to that TTI.

Pursuant to the above, in some embodiments, additional signaling may be used to temporarily freeze the resource allocation selection in the table to a specified entry of the table (e.g., for a particular application). Thus, the UE may receive signaling from the network indicating that the network has frozen selection of this entry until further notice from the network. In some embodiments this signaling may be RRC, media access control (MAC) control element (CE), or L1 signaling. Due to the slow changing nature of this parameter, in some embodiments, MAC CE may be used as the preferred type of signaling to achieve this. For example, the MAC CE may be used to activate the feature with an index pointing to the specified (target) entry of the table. Once activated, the UE may consider the time domain resource allocation fixed and known prior to decoding PDCCH. When the feature is deactivated through the MAC CE, the UE may no longer assume any prior knowledge about those parameters.

From the perspective of the UE, a different UE implementation may result in different preferences regarding resource allocation patterns. It is possible that some UE implementations support power saving for both same-slot scheduling and cross-slot scheduling patterns, whereas some other UE may only support power savings for cross-slot scheduling allocation patterns. The UE may also detect a subset of patterns configured by the RRC, where the allocation patterns in that subset may facilitate power savings for the UE. Accordingly, in some embodiments, the UE may transmit information to NW, indicating to the network what the UE's preferred parameters/allocation patterns are. For example, the UE may transmit a capability report to network, or it may transmit corresponding information via some other signaling framework, in which the UE may report its preferred parameters or resource allocation patterns to the network, for example to a base station/gNB.

For example, the UE may report its capability indicating whether the UE supports power saving for same-slot scheduling and/or cross-slot scheduling. The UE may equally report a subset of entries (e.g., the indexes to the RRC time-domain wireless-resource allocation table) to the network (e.g., base station/gNB) as the preferred resource allocation parameters for the UE. In yet some other embodiments, the UE may simply initiate a time-domain resource allocation entry change request and send such request to the network (e.g. base station/gNB). For example, if the network is using one entry from the table which does not provide the UE with power savings, the UE may explicitly request the network (e.g. the gNB) to change to a specified entry which can provide power savings to the UE.

As noted above, FIGS. 18-20 show respective exemplary tables configured with different sets of default time-domain resource allocation patterns. In each Figure, preferred resource allocation patterns for reduced power use are indicated by dashed lines. As previously noted, "K0" indicates a distance between the physical control channel and its corresponding physical data channel denoted in number of slots, "S" indicates the physical data channel start symbol, "L" indicates the physical data channel length denoted in number of symbols, the "PDSCH Mapping Type" indicates the mapping type for the physical data channel, and "DMRS-Type A-Position" indicates the demodulation reference signal position corresponding to Type A mapping in the physical data channel. The tables in FIGS. 18-20 are shown as examples only to illustrate various entries that may be assignable to UEs by base stations in certain embodiments. The indicated preferred resource allocation patterns may indicating to the network/requested from the network by the UE as previously described.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A processor comprising:
an interface configured to receive and provide signals; and
processing circuitry configured to interoperate with the interface to:
obtain, through signaling between a device and a wireless network, an indication of a specified time-domain wireless-resource allocation (TWRA) pattern configured by the wireless network for wireless communications of the device for a given transmit time interval (TTI) for which a corresponding downlink control information (DCI) has not yet been transmitted; and
cause radio frequency (RF) circuitry to conduct the wireless communications during the given TTI using resources allocated according to the specified TWRA pattern without first having to decode the corresponding DCI to start conducting the wireless communications during the given TTI, in response to obtaining the indication of the specified TWRA pattern through the signaling between the device and the wireless network;
wherein to obtain the indication of the specified TWRA pattern, the processor is configured to cause the RF circuitry to perform one or more of the following:
request the wireless network to change from a presently selected TWRA pattern to the specified TWRA pattern; or
transmit to the wireless network an indication of one or more preferred TWRA patterns.

2. The processor of claim 1, wherein to obtain the indication of the specified TWRA pattern, the processing circuitry is configured to further interoperate with the interface to perform one or more of the following:
cause the RF circuitry to obtain an indication from the wireless network that the device is to use the resources allocated according to the specified TWRA pattern until indicated otherwise by the network;
cause the RF circuitry to transmit to the wireless network an indication of preferred parameters associated with the wireless communications and further associated with the specified TWRA pattern; or
cause the RF circuitry to transmit to the wireless network a request to have the network change from a different TWRA pattern to the specified TWRA pattern.

3. The processor of claim 1, wherein power consumption of the device is reduced in response to the device conducting the wireless communications using resources allocated according to the specified TWRA pattern instead of using resources allocated according to the presently selected TWRA pattern.

4. The processor of claim 1, wherein to obtain the indication of the specified TWRA pattern, the processor is configured to further interoperate with the interface to cause the RF circuitry to obtain an indication from the wireless network that the specified TWRA pattern will remain selected until otherwise indicated to the device by the network.

5. The processor of claim 1, wherein the processing circuitry is configured to identify the one or more TWRA patterns prior to causing the RC circuitry to transmit the indication of the one or more preferred TWRA patterns to the wireless network.

6. The processor of claim 1, wherein to obtain the indication of the specified TWRA pattern, the processing circuit is configured to further interoperate with the interface to cause the RF circuitry to transmit to the wireless network a capability report indicating power saving capabilities of the device.

7. The processor of claim 1, wherein the specified TWRA pattern originates from a table.

8. The processor of claim 7, wherein the table includes multiple entries, each entry of the multiple entries representing a respective TWRA pattern, with a specified entry of the multiple entries representing the specified TWRA pattern.

9. The processor of claim 8, wherein the request to change from the presently selected TWRA pattern to the specified TWRA pattern comprises a request to have the specified entry selected.

10. The processor of claim 8, wherein the indication of the one or more preferred TWRA patterns comprises an indication of corresponding one or more preferred entries of the multiple entries.

11. A device comprising:
radio circuitry configured to facilitate wireless communications of the device; and
a processor communicatively coupled to the radio circuitry and configured to interoperate with the radio circuitry to:
obtain, through signaling between the device and a wireless network, indication of a specified time-domain wireless-resource allocation (TWRA) pattern configured by the wireless network for wireless communications of the device for a given transmit time interval (TTI) for which a corresponding downlink control information (DCI) has not yet been transmitted; and
conduct the wireless communications during the given TTI using resources allocated according to the specified TWRA pattern without first having to decode the corresponding DCI to start conducting the wireless communications during the given TTI, in response to obtaining the indication of the specified TWRA pattern through the signaling between the device and the wireless network;
wherein to obtain the indication of the specified TWRA pattern, the processor is configured to further interoperate with the radio circuitry to perform one or more of the following:
request the wireless network to change from a presently selected TWRA pattern to the specified TWRA pattern; or
transmit to the wireless network an indication of one or more preferred TWRA patterns.

12. The device of claim 11, wherein to obtain the indication of the specified TWRA pattern, the processor is configured to further interoperate with the radio circuitry to perform one or more of the following:
obtain an indication from the wireless network that the device is to use the resources allocated according to the specified TWRA pattern until indicated otherwise by the wireless network;
transmit to the wireless network an indication of preferred parameters associated with the wireless communications and further associated with the specified TWRA pattern; or transmit to the wireless network a request to have the network change from a different TWRA pattern to the specified TWRA pattern.

13. The device of claim 11, wherein to obtain the indication of the specified TWRA pattern, the processor is configured to further interoperate with the radio circuitry to perform one or more of the following:
   obtain an indication from the wireless network that the specified TWRA pattern is used until otherwise indicated to the device by the network;
   transmit to the wireless network a capability report indicating power saving capabilities of the device.

14. The device of claim 11, wherein power consumption of the device is reduced in response to the device conducting the wireless communications using resources allocated according to the specified TWRA pattern instead of using resources allocated according to the presently selected TWRA pattern.

15. The device of claim 11, wherein the specified TWRA pattern originates from a table, and wherein the table includes multiple entries, each entry of the multiple entries representing a respective TWRA pattern, with a specified entry of the multiple entries representing the specified TWRA pattern.

16. A non-transitory memory element storing instructions executable by a processor to cause a device to:
   obtain, through signaling between the device and a wireless network, indication of a specified time-domain wireless-resource allocation (TWRA) pattern configured by the wireless network for wireless communications of the device for a given transmit time interval (TTI) for which a corresponding downlink control information (DCI) has not yet been transmitted; and
   conduct the wireless communications during the given TTI using resources allocated according to the specified TWRA pattern without first having to decode the corresponding DCI to start conducting the wireless communications during the given TTI, in response to obtaining the indication of the specified TWRA pattern through the signaling between the device and the wireless network;
   wherein to obtain the indication of the specified TWRA pattern, the instructions are executable by the processor to further cause the device to perform one or more of the following:
      request the wireless network to change from a presently selected TWRA pattern to the specified TWRA pattern; or
      transmit to the wireless network an indication of one or more preferred TWRA patterns.

17. The non-transitory memory element of claim 16, wherein to cause the device to obtain the indication of the specified TWRA pattern, the instructions are executable by the processor to further cause the device to perform one or more of the following:
   obtain an indication from the wireless network that the device is to use the resources allocated according to the specified TWRA pattern until indicated otherwise by the wireless network;
   transmit to the network an indication of preferred parameters associated with the wireless communications and further associated with the specified TWRA pattern; or
   transmit to the network a request to have the network change from a different TWRA pattern to the specified TWRA pattern.

18. The non-transitory memory element of claim 16, wherein to cause the device to obtain the indication of the specified TWRA pattern, the instructions are executable by the processor to further cause the device to perform one or more of the following:
   obtain an indication from the wireless network that the specified TWRA pattern is used until otherwise indicated to the device by the network; or
   transmit to the network a capability report indicating power saving capabilities of the device.

19. The non-transitory memory element of claim 16, wherein power consumption of the device is reduced in response to the device conducting the wireless communications using resources allocated according to the specified TWRA pattern instead of using resources allocated according to the presently selected TWRA pattern.

20. The non-transitory memory element of claim 16, wherein the specified TWRA pattern originates from a table, and wherein the table includes multiple entries, each entry of the multiple entries representing a respective TWRA pattern, with a specified entry of the multiple entries representing the specified TWRA pattern.

* * * * *